United States Patent [19]

Park

[11] Patent Number: 5,050,010

[45] Date of Patent: Sep. 17, 1991

[54] DUAL VIDEO SIGNAL SIMULTANEOUS RECORDING APPARATUS FOR A VCR

[75] Inventor: Kwang S. Park, Seoul, Rep. of Korea

[73] Assignee: Goldstar Co., Ltd., Seoul, Rep. of Korea

[21] Appl. No.: 284,665

[22] Filed: Dec. 15, 1988

[30] Foreign Application Priority Data

Dec. 15, 1987 [KR] Rep. of Korea ............... 22188/1987

[51] Int. Cl.$^5$ .......................................... H04N 5/782
[52] U.S. Cl. ................................................ 360/33.1
[58] Field of Search ............... 358/310, 335, 330, 334, 358/311, 108, 88, 3, 313, 91, 92; 360/33.1, 14.1, 11.1, 64, 18, 19.1

[56] References Cited

U.S. PATENT DOCUMENTS

| | | | |
|---|---|---|---|
| 3,991,266 | 11/1976 | Baer | 358/92 |
| 4,027,333 | 5/1977 | Kaiser et al. | 358/313 |
| 4,139,868 | 2/1979 | Eisenberg et al. | 360/33.1 |
| 4,656,527 | 4/1987 | Uchimi | 358/310 |
| 4,774,597 | 9/1988 | Harvey | 358/335 |

*Primary Examiner*—Donald McElheny, Jr.

[57] ABSTRACT

A dual video signal simultaneous recording system for a VCR in which two different source video signals are simultaneously recorded on one video tape. The system includes two additional video heads on the head drum each kept within angles of 90° relative to the existing heads. A second video signal is fed to the additional video heads while keeping a predetermined delay period of time interval relative to a first video signal fed to the existing video heads. The system includes a first record system, synchronous separators, a gate array, an analog/digital converter, switches, field memories, a digital/analog converter, and a second record system. The system is also characterized in that the gate array outputs switching control signals, memory control signals, and conversion control signals derived from a head switching signal, a record signal, and synchronous signals. Furthermore, the azimuth angles of the additional video heads are different than the azimuth angles of the existing heads, so that two different source video signals input simultaneously can be recorded on one video tape by one video recorder and player.

6 Claims, 6 Drawing Sheets

DUAL VIDEO SIGNAL SIMULTANEOUS RECORDING APPARATUS FOR A VCR

BACKGROUND OF THE INVENTION

1. Field of the Invention

The present invention relates to a video recording and reproducing apparatus in which video heads are traced along a video tape whereby video signals are recorded and reproduced. More specifically, this invention relates to a dual video signal simultaneous recording apparatus for a video cassette tape recorder (hereinafter, referred to as a VCR) in which four video heads are arranged on a head drum at angles of 90° with respect to each other, each of the different two video signals are supplied to said four video heads so that two different video signals are recorded simultaneously on a video tape.

2. Description of the Background Art

Heretofore, a video recording apparatus of a VCR has been, as shown in FIG. 1, structured such that an input video signal VS passes through a recording system 10 which is composed of automatic gain controller 11, low pass filter 12, pre-emphasis 13, frequency modulator 14, color signal pass filter 15, color signal low band converter 16, mixer 17 and record amplifier 18. The input video signal further passes through record/play switches SW1, SW2 and is applied to video heads CH1, CH2 so that it is recorded on a video tape, while in the case of play back, the video signal detected from the video tape by the video heads CH1, CH2 is input through the record/play switches SW1, SW2 to the play back system so that play back is realized.

Considered in more detail, when a video signal VS to be recorded on a video tape is input, said video signal VS is controlled to a predetermined level in gain through the automatic gain controller 11. A luminance signal from this gain controlled video signal VS passes through the low pass filter 12 and pre-emphasis 13 so that a high band portion emphasized thereafter is modulated at the frequency modulator 14 and applied to the mixer 17. The color signal from said gain controlled video signal VS passes through the color signal pass filter 15 and then the color signal low band converter 16 to be converted to a low band signal thereafter which is applied to the mixer 17 and thereby mixed with the luminance signal which is modulated by said frequency modulator 14. The mixed signal is amplified through the record amplifier 18 and passed through the record/play switches SW1, SW2 which are controlled with the record/play control signal REC/$\overline{PL}$ then applied to the video heads CH1, CH2 so that it is recorded on the track of video tape in helical state.

Thus, in the case where the video signal recorded on a video tape is intended to be played back, the video signal detected from a video tape by video heads CH1, CH2 is input through the record/play switches SW1, SW2 to the play back system so that play back is executed. The above described typifies the conventional video recorder and player.

By the way, in the case where a video tape is driven to run in standard mode, i.e., SP mode, as shown in FIG. 2, a track of predetermined width D1 is formed on the video tape T, and at this moment, if the video heads CH1, CH2 are formed of the same width D1 of track, then the video signal is recorded on or played back from the entire width D1 of track. Practically, however, the video heads CH1, CH2 become to be formed less than the width D1 of the track for a long period mode, i.e., EP mode and LP mode in which a video tape T is driven to run at $\frac{1}{2}$ times and $\frac{1}{3}$ times the speed relative the standard mode. In accordance with this, the video signal is recorded with approximately about $\frac{1}{2}$ degree less width D2 than a width D1 of track on the video tape T, and at this moment, the track of said video tape T becomes to have a predetermined width D3 which is not recorded with a video signal.

However, in the case of this conventional video recording system, since it is constructed on record to a video tape by selecting only one signal source, there has been a disadvantage that dual video source signals are not able to record simultaneously on one video tape.

SUMMARY OF THE INVENTION

Therefore, an object of the present invention is to provide a dual video signal simultaneous recording apparatus which is capable of recording simultaneously two different source video signals on one video tape.

The above object of the present invention is attained by such a manner that two more video heads are additionally arranged which are spaced at intervals of 90° angles relative to the existing video heads so as to be able to trace the portion which is not yet recorded with a video signal among the track of video tape using a standard mode, and another video signal is supplied to said additionally arranged video heads with a predetermined delay time relative to the video signal supplied to the existing video heads.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 4(A) to (C) are explanatory diagrams each illustrating the state in which the video heads are arranged by a dual video signal simultaneous recording apparatus according to the present invention, in which FIG. 4(A) is a top view of the head drum which is arranged with video heads, FIG. 4(B) is a development diagram of the video heads, FIG. 4(C) is a front elevational view which shows the azimuth angles of each video head;

DETAILED DESCRIPTION OF THE INVENTION

Figure 1:
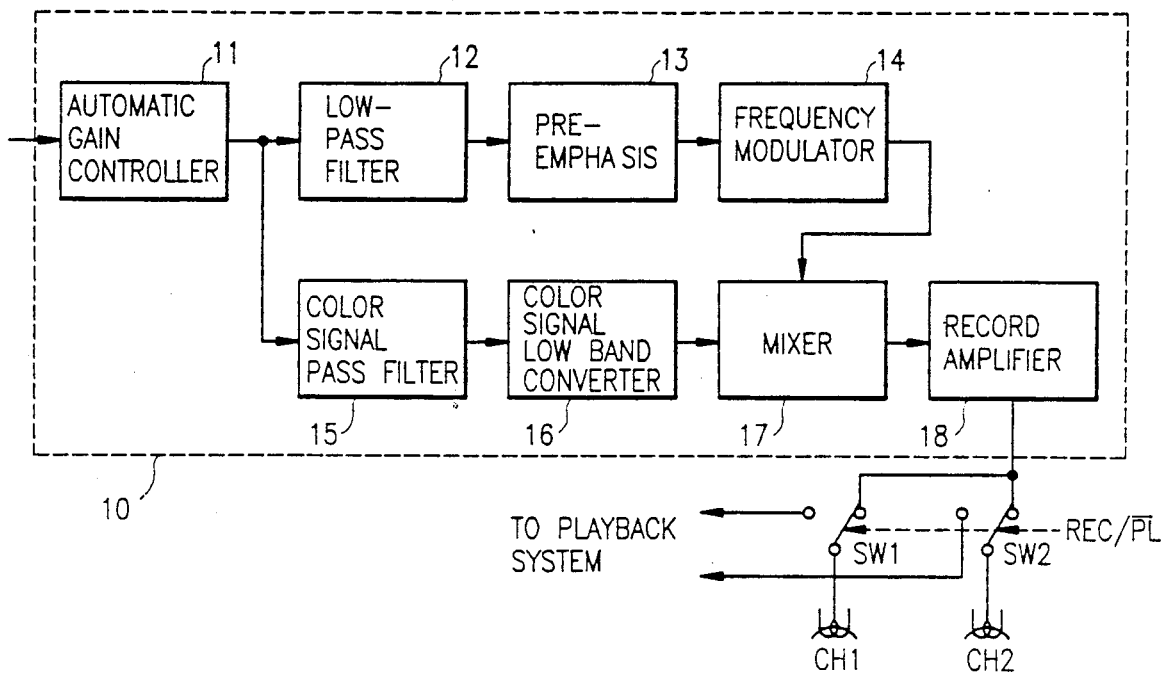
FIG. 1 is a block diagram of a video signal recording apparatus of a conventional video recorder and player.
Figure 2:
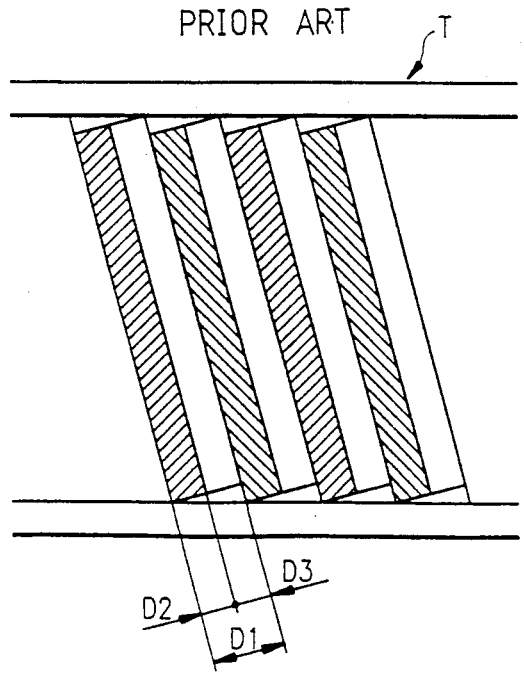
FIG. 2 is an explanatory diagram illustrating the tracks of a video tape in which the video signal is recorded by a conventional video signal recording apparatus.
Figure 3:
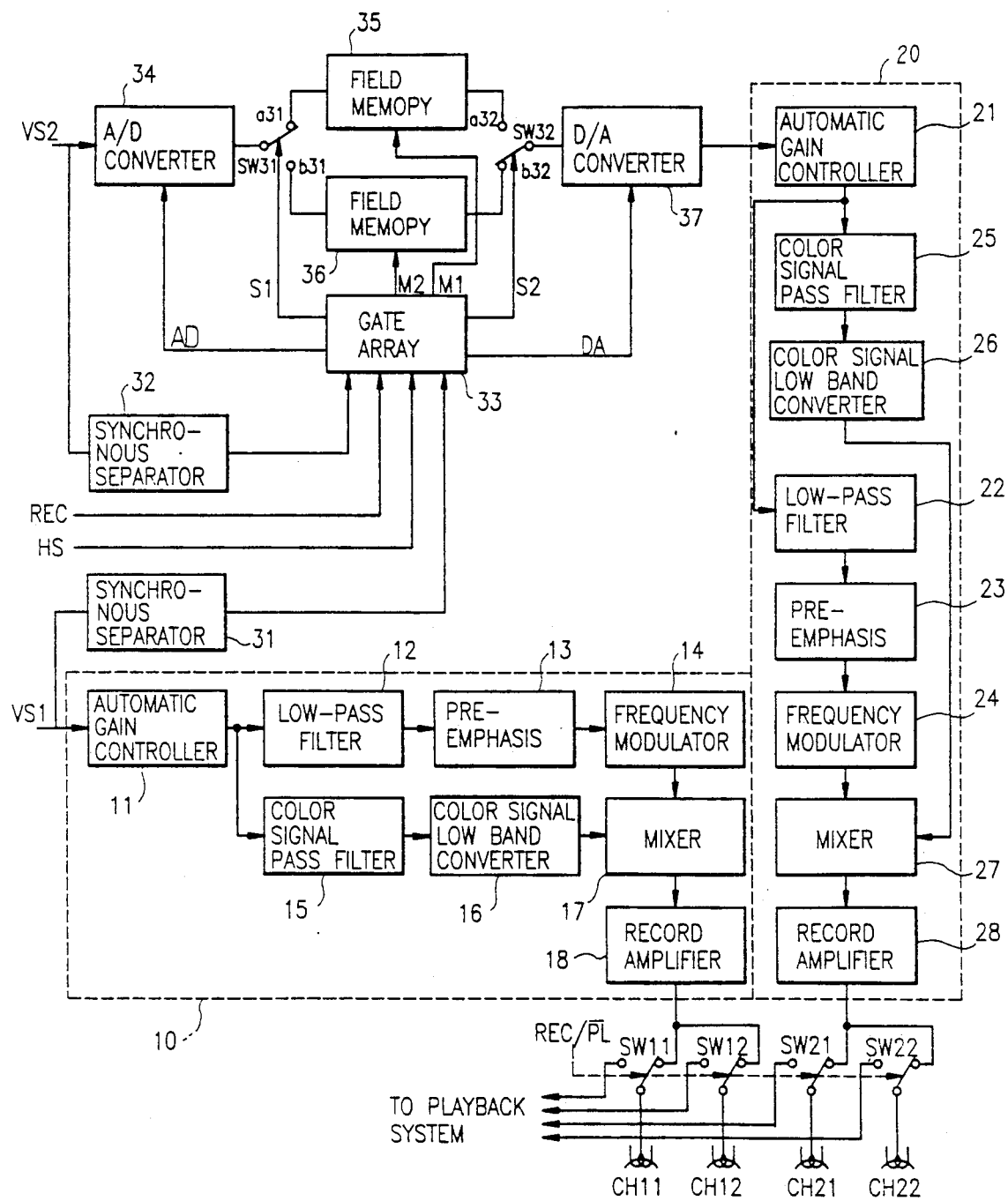
FIG. 3 is a block diagram of a dual video signal simultaneous recording apparatus according to the present invention.

FIG. 3 is a block diagram of a dual video signal simultaneous recording apparatus according to the present invention, as shown in the drawing, which is constructed with a recording system 10 which converts a first video signal VS1 into a recording signal; record/-play back switches SW11, SW12 which select the output signal of said recording system 10 by record/play back control signal REC/$\overline{PL}$; video heads CH11, CH12 which either records the signal selected from said record/play switches SW11, SW12 onto a video tape, or detects the signal recorded on said video tape; synchronous separators 31, 32 which separate respectively the synchronous signals from said first video signal VS1 and second video signal VS2; a gate array 33 which produces the conversion control signals AD, DA and the switching control signal S2 from the output signals of said synchronous separators 31, 32 and a record control signal REC, and produces the switching control signal S1 and the memory control signals M1, M2 from a head switching signal HS; an analog/digital converter 34 which converts said second video signal VS2 into a digital signal under the control of said conversion control signal AD; a switch SW31 which outputs selectively the output signal of said analog/digital converter 34 by said switching control signal S1; field memories 35, 36 which store and output the signal output from said switch 31 by said memory control signals M1, M2 by one field; a switch SW32 which selects and outputs the output signal of said field memories 35, 36 by said switching control signal S2; a digital/analog converter 37 which converts the output signal of said switch SW32 into an analog signal by said conversion control signal DA; a recording system 20 which converts the output signal of said digital/analog converter 37 into the recording signal; the record/play switches SW21, SW22 which select the output signal of said recording system 20 by the record/play control signal REC/$\overline{PL}$; and video heads CH21, CH22 which either record the signal selected from said record/play switches SW22, SW22 onto a video tape, or detect the signal recorded on said video tape.

Figure 4A:
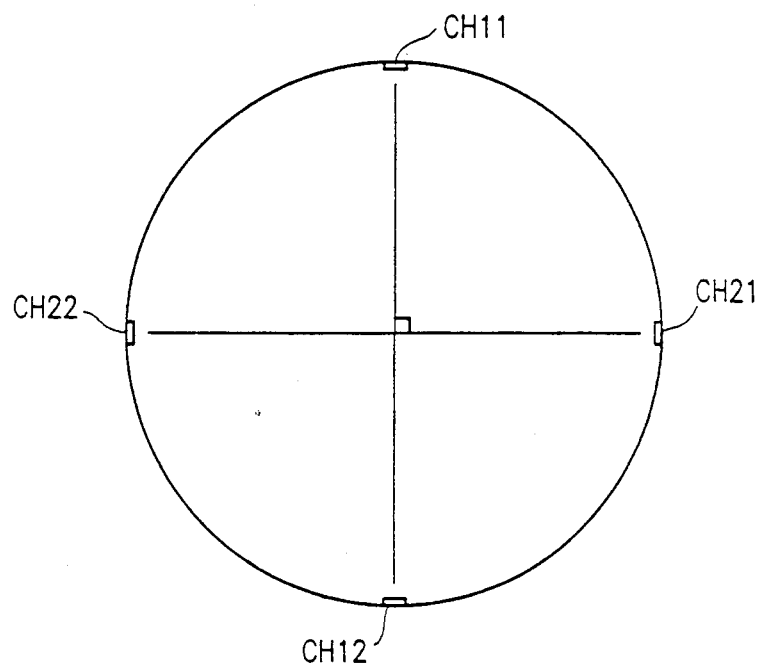
Figure 4B:
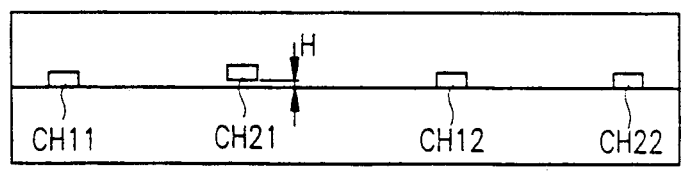
Figure 4C:
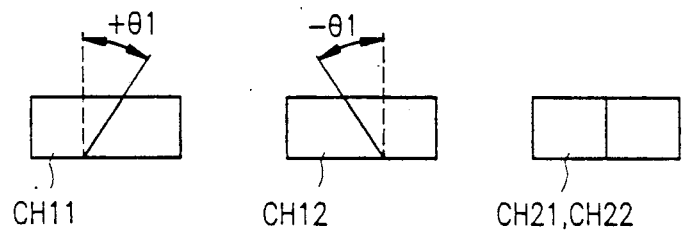

FIGS. 4(A) to (C) are the explanatory diagrams showing the arranged states of said video heads CH11, CH12, CH21, CH22, as shown in the drawings, in which the video heads CH21, CH22 are arranged with angles of 90° relative to the video heads CH11, CH12, and which are arranged on a head drum 41 spaced apart from each other by angle of 180° as well as higher by predetermined height H than said video heads CH11, CH12. The azimuth angles of said video heads CH21, CH22 are formed differently from the azimuth angles $+\theta 1$, $-\theta 1$ of the video heads CH11, CH12. For an example, the azimuth angles of the video heads CH21, CH22 are formed at the angles of 0°.

Figure 5:
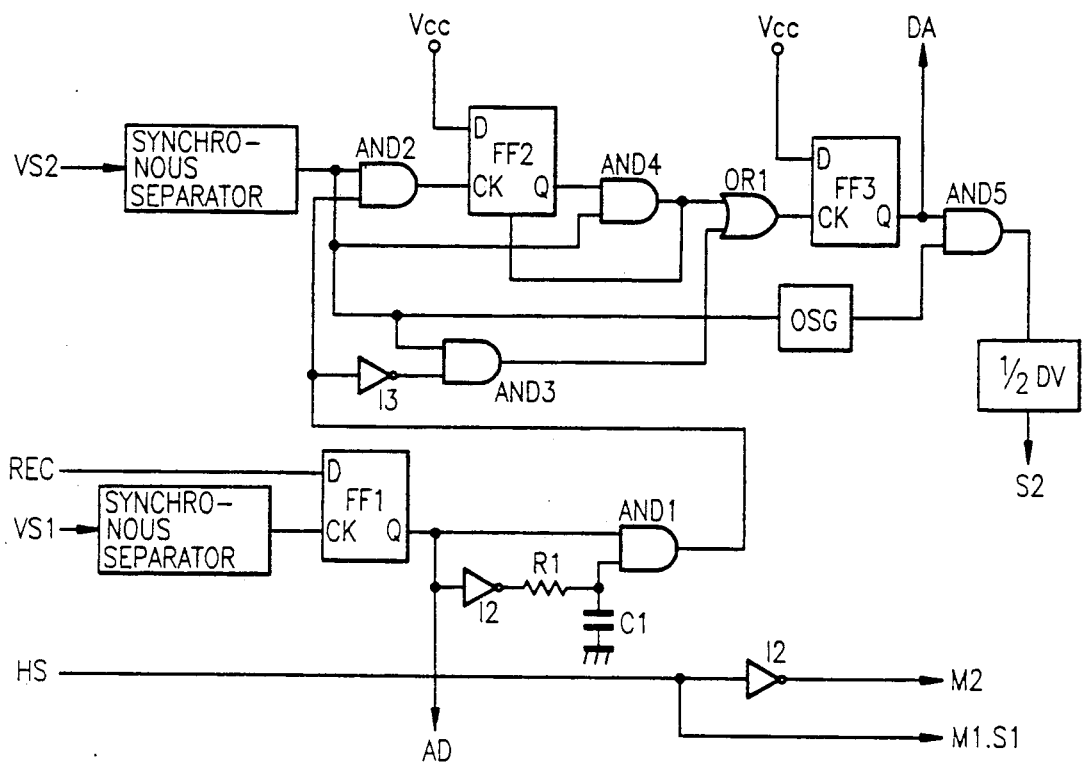
FIG. 5 is a detailed circuit diagram of the gate array in FIG. 3.

FIG. 5 is a circuit diagram of an example of said gate array 33, as shown in the drawing, which is arranged such that a head switching signal HS is output as a switching control signal S1 and a memory control signal M1, as well as a memory control signal M2 by being inverted through an inverter I1. A record control signal REC and the output signal of the synchronous separator 31 are connected to be applied respectively to the input terminals D, CK of a flip-flop FF1, and the output signal from the output terminal Q of flip-flop FF1 is rendered as said conversion control signal AD. The output terminal Q of said flip-flop FF1 is connected to a first input terminal of an AND gate AND1 and is also connected to a capacitor C1 and to another input terminal of said AND gate AND1 through an inverter I2 and a resistor R1. The output terminal of this AND gate AND1 and the output terminal of a synchronous separator 32 are connected through an AND gate AND2 to an input terminal CK of a flip-flop FF2, and the output terminal Q of said flip-flop FF2 and the output terminal of said synchronous separator 32 are connected in common through an AND gate AND4 to a reset terminal R of said flip-flop FF2 and a first input terminal of an OR gate OR1. After the output of said AND gate AND1 is passed through an inverter I3, together with the output of said synchronous separator 32, the signals are passed through an AND gate AND3 and then connected to the other input terminal of said OR gate OR1. The output terminal of this OR gate OR1 is connected to an input terminal CK of a flip-flop FF3, so that the signal of the output terminal Q of said flip-flop FF3 is allowed as be output to said conversion control signal DA. On the other hand, the output terminal of said synchronous separator 32 is connected through a one-shot generator OSG to a first input terminal of an AND gate AND5. The output terminal Q of said flip-flop FF3 is connected to the other input terminal of said AND gate AND5. The output signal of this AND gate AND5 is connected as output switching control signal S2 through a ½ frequency multiplier DV.

The operation and effect of the present invention constructed as described hereinabove will be explained in detail with reference to the accompanying wave form views as follows.

Figure 6:
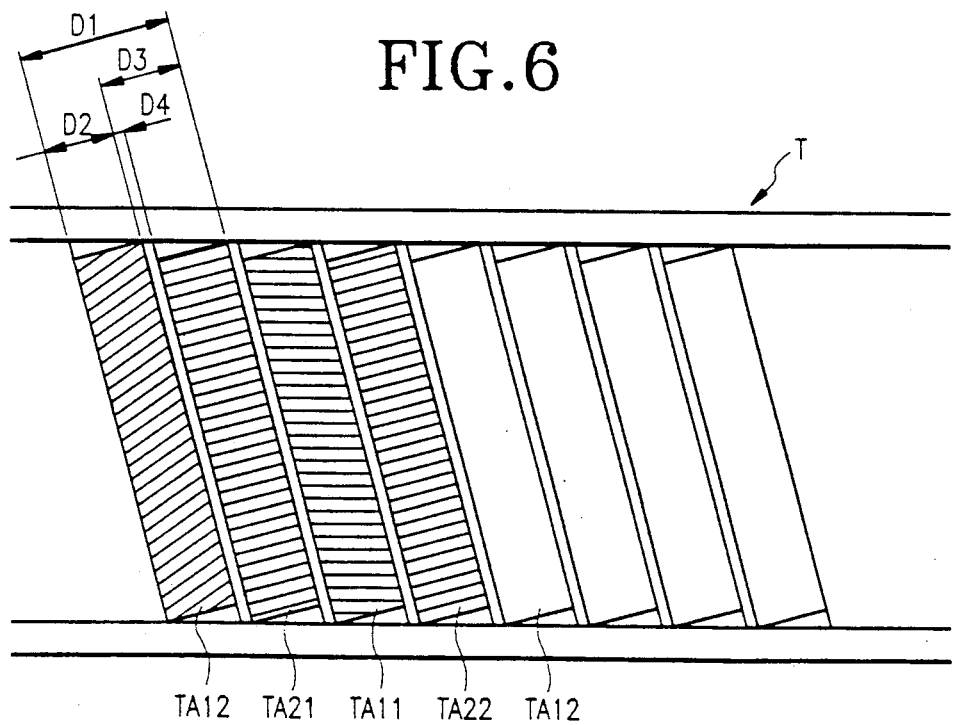
FIG. 6 is an explanatory diagram illustrating the tracks of a video tape which is recorded with two different source video signals by a dual video signal simultaneous recording apparatus according to the present invention.

When a first video signal VS1 is input, said first video signal VS1 passes through the record system 10 as usual. At this moment, as shown in FIG. 7 (A), the signal which is passed through said record system 10 is applied to the video heads CH11, CH12 through the record/play switches SW11, SW12, which receive the record/play control signal REC/PL, and then as shown in FIG. 6, they are recorded on the tracks TA11, TA12 of a video tape T.

Figure 7A:
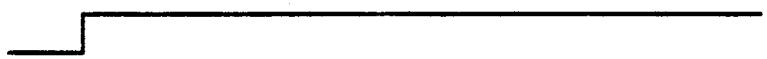
FIGS. 7(A)-7(J) and FIGS. 8(A)-8(J) are the wave form views of each part in FIG. 5.
Figure 7B:
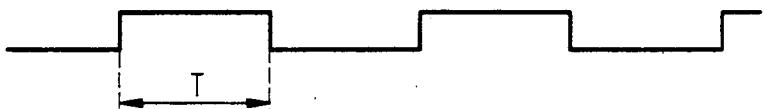
Figure 7C:
Figure 7D:

On the other hand, at this moment, since the first video signal VS1 is applied to a synchronous separator 31, the synchronous signal is output from said synchronous separator 31 as shown in FIG. 7(C) and then applied to a clock terminal CK of flip-flop FF1. Therefore, at this moment, the high potential signal is output at the output terminal Q of said flip-flop FF1 as shown in FIG. 7(D), and this high potential signal is applied to an analog/digital converter 34 as a conversion control signal AD. Therefore, at this moment, when the second video signal VS2 is input, said second video signal VS2 is converted and output as a digital signal at the analog/digital converter 34. At this moment, the head switching signal HS is applied as shown in FIG. 7(B), and said head switching signal HS is applied to a switch SW31 as a head switching signal S1. At the same time, the switching signal HS is applied to a field memory 35 as a memory control signal M1, and further, said head switching signal HS is inverted at an inverter I1 as shown in FIG. 7 (J) and then applied to a field memory 36 as a memory control signal M2.

Therefore, since switch SW31 is short circuited to its fixed terminal a in a state of high potential of head switching signal HS, the output signal of analog/digital converter 34 is stored at a field memory 35, and since switch SW31 is short circuited to its fixed terminal b in a state of low potential of head switching signal HS, the output signal of analog/digital converter 34 is stored at a field memory 36. As a result, the output signal of analog/digital converter 34 is stored alternatively by one field in the field memories 35, 36.

On the other hand, since the high potential signal output at the output terminal Q of said flip-flop FF1 is applied to the first input terminal of AND gate AND1, and at the same time is inverted to a low potential signal at an inverter I2, the high potential signal is output at said AND gate AND1 during a discharging period of time in accordance with a resistor R1 and a capacitor C1.

Figure 7E:
Figure 7F:
Figure 7G:
Figure 7H:
Figure 7I:
Figure 7J:

When a discharging period of time of resistor R1 and capacitor C1 is established so as to correspond to ½ of the synchronous signal period T output from said synchronous separator 31, the high potential signal is output for said period T/2 at AND gate AND1 as shown in FIG. 7(E). This high potential signal is applied to an input terminal of AND gate AND2 and at the same time is inverted to the low potential signal at an inverter I3 and then applied to an input terminal of AND gate AND3. Therefore, when a synchronous signal is output from a synchronous separator 32 as shown in FIG. 7(F) during the time when the high potential signal is output from said AND gate AND1, the high potential signal is output from AND gate AND2, and since it is applied to a clock terminal CK of flip-flop FF2, the high potential signal is output at said output terminal Q and then applied to an input terminal of AND gate AND4. In accordance with this, the high potential signal is output at said AND gate AND4 when a second synchronous signal is output from the synchronous separator 32, and since this high potential signal is applied to a clock terminal CK of flip-flop FF3 through OR gate OR1, the high potential signal is output at said output terminal Q as shown in FIG. 7(G). Since this high potential signal is applied to a digital/analog converter 37 as a conversion control signal DA, said digital/analog converter 37 converts and outputs the digital video signal input through the switch SW32 into an analog signal. On the other hand, since the high potential signal output from said AND gate AND4 is applied to a reset terminal R of flip-flop FF2, said flip-flop FF2 becomes reset and the low potential signal is output again at said output terminal Q. Further, since the synchronous signal output from said synchronous separator 32 is applied to one-shot generator OSG, the square wave signal having a period of said synchronous signal is generated at said one-shot generator OSG as shown in FIG. 7(H) and then applied to an input terminal of AND gate AND5. Therefore, the output signal of one-shot generator OSG is output through said AND gate AND5 during a state in which the high potential signal is output at the output terminal Q of flip-flop FF3, and this output signal is multiplied by ½ frequency multiplier DV as shown in FIG. 7(I) and then applied to a switch SW32 as a switching control signal S2. Therefore, since the switch SW32 becomes short-circuited to its fixed terminal a32 when said switching control signal S2 is in a high potential state, a digital video signal for one field stored in field memory 35 at the transferring state is converted to an analog signal at digital/analog converter 37 through said switch SW32. Since switch SW32 becomes short-circuited to its fixed terminal b32 when the switching signal S2 is in a low potential state, a digital video signal for one field stored in field memory 36 at the transferring state is converted to an analog signal at digital/analog converter 37 through said switch SW32.

As a result, the second video signal VS2 is converted into a digital signal at the analog/digital converter 34 and thereafter is stored alternatively by one field at each of the field memories 35, 36 in synchronism the synchronous signal of the first video signal VS1. A digital video signal for one field stored in the transferring state at said field memories 35, 36 is output alternatively in synchronization with a half period delayed signal from the second synchronous signal and then converted to analog signal at the digital/analog converter 37.

Thus, the signal which is converted into an analog signal and output at the digital/analog converter 37 passes through the recording system 20 and thereafter is applied to the video heads CH21, CH22 through record/play switches SW21, SW22, which receive the record/play control signal REC/PL, and are then recorded on the tracks TA21, TA22 of a video tape T as shown in FIG. 6.

Figure 8A:
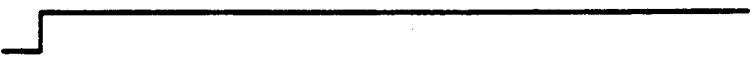
Figure 8B:
Figure 8C:
Figure 8D:
Figure 8E:
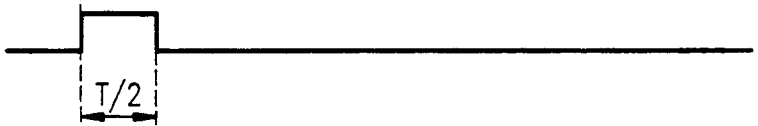
Figure 8F:

On the other hand, though the above described explanation is a case in which a synchronous signal is output from a synchronous separator 32 during the time when the high potential signal is output at AND gate AND1, in the case where the synchronous signal is not output from a synchronous separator 32 during the high potential signal being output at said AND gate AND1, the gate array 33 is operated as in the wave form views in FIGS. 8(A)–8(J). That is to say, when the synchronous signal is output from a synchronous separator 32 as shown in FIG. 8(F) in a state that a low potential signal is output at said AND gate AND1, the high potential signal is not output at AND gate AND1 as shown in FIG. 8(E), said synchronous signal is applied to an input terminal of AND gate AND3, and the low potential signal output from AND gate AND1 is inverted into a high potential signal at an inverter I3 and then applied to the other input terminal of said AND gate AND3.

Figure 8G:
Figure 8H:
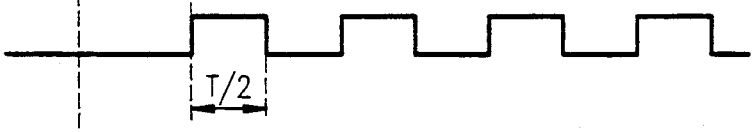
Figure 8I:
Figure 8J:

Therefore, since the high potential signal is output from AND gate AND3 when the first synchronous signal is output from the synchronous separator 32, and this high potential signal is applied to a clock terminal CK of flip-flop FF3 through the OR gate OR1, the high potential signal is output at said output terminal Q as shown in FIG. 8(G), and this high potential signal is applied to the digital/analog converter 37 as a conversion control signal DA. In addition, since the synchronous signal output from said synchronous separator 32 is applied to one-shot generator OSG, a square wave signal as shown in FIG. 8(H) is generated and output at said one-shot generator OSG, and this output signal is frequency multiplied as shown in FIG. 8(I) by ½ frequency multiplier DV through the AND gate AND5 and then applied to a switch SW32 as a switching control signal S2.

As a result, at this moment, the second video signal VS2 is converted at analog/digital converter 34 and thereafter is stored by one field alternatively in each of field memories 35, 36 in synchronization with the synchronous signal of the first video signal VS1. The digital video signal for one field stored in the transferring state at said field memories 35, 36 is output alternatively in synchronization with a half period delayed signal from the first synchronous signal of the second video signal VS2 and then converted to an analog signal at the digital/analog converter 37, and the output signal of this digital/analog converter 37 is passed through the recording system 20 and thereafter is applied to the video heads CH21, CH22 through the record/play switches SW21, SW22, which receive the the record/play control signal REC/$\overline{PL}$ and is then recorded on a video tape T.

In the above description, the reason why the second video signal VS2 stored at the field memories 35, 36 is output with delay of a half period from the synchronous signal of said second video signal VS2 is that the video heads CH21, CH22 trace the tracks TA21, TA22 after a half period has elapsed from the moment the video heads CH11, CH12 have traced the tracks TA11, TA12 of a video tape T because the video heads CH21, CH22 are arranged on a head drum so as to maintain angles of 90° with with respect to each of the video heads CH11, CH12. On the other hand, since the video heads CH21, CH22 are arranged higher by a predetermined height H than the video heads CH11, CH12, a gap of predetermined width D4 is formed between the tracks TA11, TA21, TA12, TA22, as shown in FIG. 6, and in accordance with this, when the video signal is recorded on and played back from the tracks TA11, TA21, TA12, TA22, no influence is relized from the adjacent tracks.

On the other hand, as described above, when a video tape which is recorded with the first and second video signals VS1, VS2, the video heads CH11, CH12; CH21, CH22 respectively trace the tracks TA11, TA12; TA21, TA22 of a video tape T and then detect respectively the first and second video signals VS1, VS2, said detected signals are input to the play back system through the record/play switches SW11, SW12; SW21, SW22 which receive the record/play control signal REC/$\overline{PL}$ to be played back.

As explained in detail hereinabove, the present invention is capable of recording the two different source video signals in one video tape simultaneously, therefore there is the advantage that two different video signals which are inputted simultaneously can both be recorded with one video recorder and player, and vice versa.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dual video signal simultaneous recording apparatus for a video cassette tape recorder, comprising:
   a first record system for converting a first video signal into a recording signal and for applying said first recording signal to first video heads through first record/play switches;
   synchronous separators for separating respectively first and second synchronous signals from said first video signal and from a second video signal;
   gate array means for producing first and second conversion control signals and a first switching control signal from said first and second synchronous signals generated by said synchronous separators and from a record control signal and for also producing a second switching control signal and memory control signals from a head switching signal;
   an analog/digital converter for converting said second video signal into a digital signal under control of said first conversion control signal;
   a first switch for outputting said digital signal of said analog/digital converter selectively to one of two terminals according to said second switching control signal;
   field memories for storing and outputting said selectively output signal from said two terminals of said first switch by one field according to said memory control signals;
   a second switch for selecting and outputting said output signal of said field memories according to said first switching control signal;
   a digital/analog converter for converting the output signal of said second switch into an analog signal according to said second conversion control signal; and
   a second record system for converting said analog signal output of said digital/analog converter into a second recording signal and for applying said second recording signal to second video heads through second record/play switches,
   said gate array means comprising
   a first flip-flop, coupled to said record control signal and said first synchronous signal, for outputting said first conversion control signal,
   a first inverter, coupled to said first conversion control signal, for outputting an inverted first conversion control signal,
   a first AND gate, coupled to said inverted first conversion control signal through first delay means, and to said first conversion control signal, for outputting a first AND signal,
   a second AND gate, coupled to said first AND signal and said second synchronous signal, for outputting a second AND signal,
   a second flip-flop, coupled to said second AND signal, for outputting a flip-flop signal, and
   a third flip-flop, coupled to said flip-flop signal, said second synchronous signal and said first AND signal, through a gating means, for outputting said second conversion control signal.

2. A dual video signal simultaneous recording apparatus according to claim 1, said gate array means outputting said head switching signal as said second switching control signal and a first of said memory control signals and also outputting said head switching signal inverted as a second of said memory control signals;
   said first conversion control signal being output at a time when said first synchronous signal is output from said synchronous separators during a state in which said record control signal is applied,
   said gate array means further operable in accordance with whether said second synchronous signal is output or not from said synchronous separators after a delay of ½ period with respect to the output of said first synchronous signal, either said second conversion control signal is output at the time that said second synchronous signal is output from said synchronous separators at the same time said first switching control signal is output after a delay of ½ period with respect to output of said second synchronous signal, or said second conversion control signal is output at the time that said first synchronous signal is output from said synchronous separators at the same time said first switching control signal is output after a delay of ½ period with respect to output of said first synchronous signal.

3. A dual video signal simultaneous recording apparatus according to claim 1, said second video heads are respectively kept within angles of 90° relative to said first video heads arranged on a head drum and are arranged higher by predetermined height than said first video heads,
   a first azimuth angle of said first video heads are different than a second azimuth angle of said second video heads.

4. A dual video signal simultaneous recording apparatus according to claim 3, said first video heads and said second video heads each comprise a respective pair of video heads,
   said first azimuth angle of said first video heads being equivalent and said second azimuth angle of said second video heads being equal and opposite in orientation with respect to each other.

5. A dual video signal simultaneous recording apparatus according to claim 1, said gating means comprising:

a second inverter, coupled to said first AND signal, for outputting an inverted first AND signal;
a third AND gate, coupled to said second synchronous signal and said inverted first AND signal, for outputting a third AND signal;
a fourth AND gate, coupled to said flip-flop signal and said second synchronous signal, for outputting a fourth AND signal; and
an OR gate, coupled to said third and fourth AND signals, for outputting an OR signal which is input to said third flip-flop.

6. A dual video signal simultaneous recording apparatus according to claim 5, said gate array means further comprising:
a one-shot generator, coupled to said second synchronous signal, for outputting a one-shot signal;
a fifth AND gate, coupled to said second conversion control signal and said one-shot signal, for outputting a fifth AND signal; and
a divider, coupled to and dividing said fifth AND signal in half, for outputting said first switching control signal.

* * * * *